July 30, 1946.  P. J. SENK  2,404,991
JAR GRIP
Filed March 23, 1944
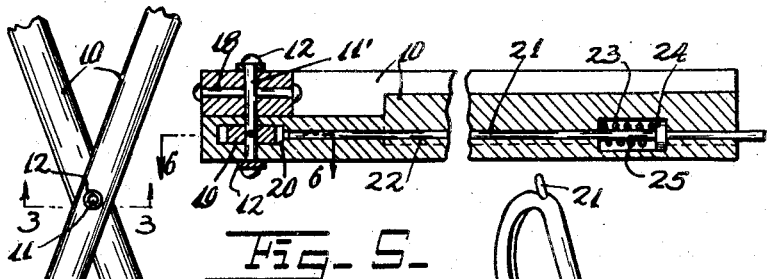
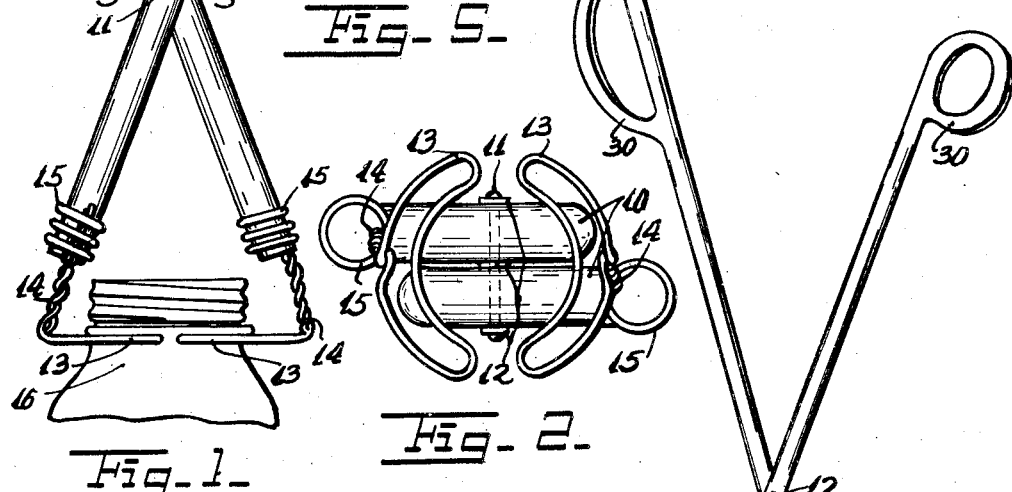
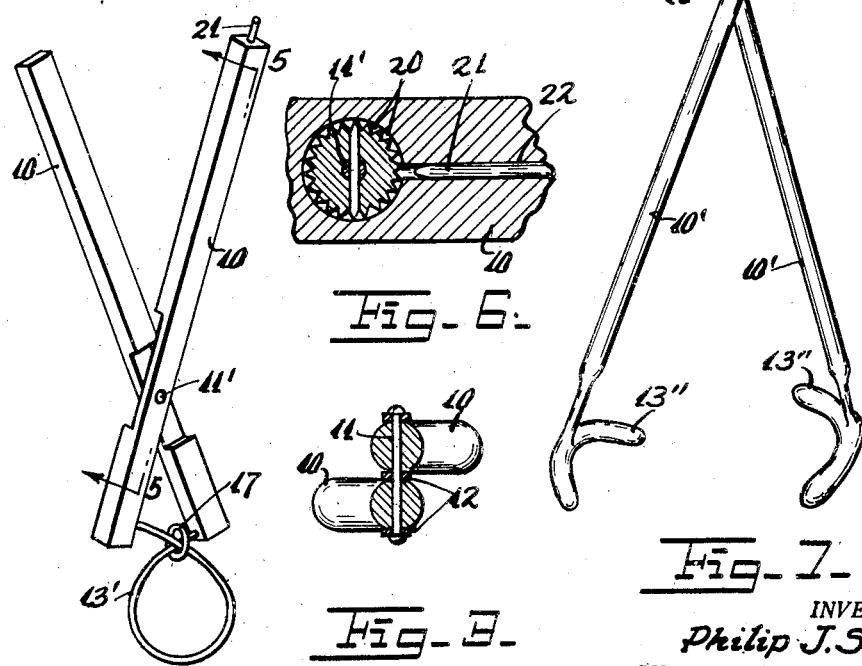
INVENTOR.
Philip J. Senk
BY
ATTORNEY Patented July 30, 1946

2,404,991

UNITED STATES PATENT OFFICE 2,404,991

JAR GRIP

Philip J. Senk, St. Albans, N. Y.

Application March 23, 1944, Serial No. 527,739

4 Claims. (Cl. 294—31)

This invention relates to new and useful improvements in a jar grip.

More specifically, the invention proposes the construction of a jar grip characterized by a pair of jar gripping elements adapted to be engaged about the neck of a jar in a manner to grip the neck. It is proposed that the jar grip be used in connection with home canning and be designed primarily to facilitate lifting hot jars out of the steam bath during hot canning process.

A further object of the invention proposes the provision of a pair of crossed and pivotally connected arms having the jar gripping elements on the front ends thereof. The arms are adapted to be gripped for expanding and retracting the size of the jar gripping elements permitting them to be tightly engaged about the jar neck when lifting the jars of different diameters.

In the several modifications of the invention differently shaped jar gripping elements are proposed. In one form of the invention, opposed gripping jars are provided and in another form of the invention an expandable loop of wire is proposed which may be contracted by means of the pivotally mounted arms in a manner to securely grip the jar about its neck.

A further object of the invention proposes the provision of a means for locking the pivotally mounted arms in various selected pivoted positions in a manner to lock the gripping elements in position when engaged about a jar neck.

It is a further object of this invention to construct a jar grip which is simple and durable, and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a jar grip constructed in accordance with this invention and shown in position upon the top of a jar.

Fig. 2 is a bottom elevational view of the jar grip per se.

Fig. 3 is an enlarged horizontal sectional view taken on the line 3—3 of Fig. 1.

Fig. 4 is a perspective view of a jar grip constructed in accordance with this invention.

Fig. 5 is a partial longitudinal sectional view taken on the line 5—5 of Fig. 4.

Fig. 6 is a partial longitudinal sectional view taken on the line 6—6 of Fig. 5.

Fig. 7 is a perspective view of a jar grip constructed in accordance with still another modification of this invention.

The jar grip, according to this invention, includes a pair of cross arms 10. At the point where the arms 10 cross they are pivotally connected. This pivotal connection is accomplished by engaging pin 11 through the crossing parts of the arms 10. Washers 12 are provided between the adjacent faces of the arms 10 and outer faces thereof.

Jar gripping elements are mounted on the front ends of the arms 10. The jar gripping elements in this form of the invention are characterized by gripping jaws 13 bent from lengths of stiff wire. After forming the gripping jaws 13 the end proportions of the length of wire are twisted about themselves forming stems 14 projected from the jaws 13 and are connected to the front ends of the arms 10 by having portions 15 bent securely thereabout.

In Fig. 1 the gripping jaws 13 are shown engaged rigidly about the neck 16, of a jar. Releasing the pressure upon the top ends of the arms 10 permits them to be spread to spread the jaws of 13 so that they may be disengaged from the neck 16. The jar grip is designed primarily for use in home canning and provides a means by which hot jars and other similar containers may be conveniently gripped to be lifted out of a hot bath.

In the modification of the invention shown in Figs. 4 to 6, the jar gripping elements comprise a loop of wire 13'. The loop of wire 13' has its ends passed slideably through a ring of 17. The ends of the loops of wire 13' after having been passed through the ring 17 are fixedly connected to the front ends of the arms 10. As the free ends of the arms are spread their opposite ends will also be spread pulling upon the ends of the loop of wire 13' contracting its diameter so that it will be caused to engage rigidly about the neck of a jar.

In this form of the invention one of the arms 10 is fixedly attached to the pivot pin 11' by means of a rivet 18 which is passed through this arm and through an adjacent portion of the pivot 11'. The other of the arms 10 is provided with a means for locking the arms 10 in various selected pivoted positions. This means comprises a small disc 19 fixedly mounted upon the pivot 11' within the other arm 10. This disc 19 has its periphery provided with a plurality of serrations 20. A rod 21 is slideably extended through a passage 22 formed within the arm 10. The rod 21 has its inner end adjacent the serrations 20 of the disc 19. The opposite end of the rod 21 is projected from the end of the arm 10 and is adapted to be manually pushed inwards to engage its inner end with the serrations 20 and lock the arms 10 against being pivoted.

Means is also provided within the interior of the arm 10 provided with the rod 21 for urging it into an extended position in which its end will be disengaged from the serration 20 freeing the arms to be pivoted. This means comprises an enlarged cavity 23 formed within the arm 10 concentric with the passage 22 through which the rod 21 is extended. Mounted upon the rod 21 within the cavity 23 there is an enlarged collar 24. An expansion spring 25 is mounted concentrically upon the rod 21 and operates between the adjacent faces of the collar 24 and wall of the cavity 23 to resiliently urge the rod 21 in an extended position in which its inner end will be disengaged from the serrations 20.

In using this form of the invention the outer ends of the arms 10 may be pressed together causing the ends to which the ends of the loop of wire 13 are attached to also be moved together. This latter movement will expand the diameter of the loop of wire 13' permitting it to be freely engaged over the top portion of the neck of a jar. The outer ends of the arms 10 may then be urged apart to pull on the ends of the loop of wire 13' contracting its diameter to rigidly grip the neck of the jar. When this position is reached the operator may press inwards upon the projected end of the rod 21 urging it inwards against the action of the spring 23 to cause the inner end of the rod 21 to engage the serrations 20. This will lock the arms 10 against being pivoted and will permit the jar grip and jar to be lifted by lifting upwards upon the arm 10 provided with the rod 21 while simultaneously pressing inwards thereon.

When the jar is again rested upon a stationary service it is merely necessary to release the pressure upon the rod 21 permitting the spring 25 to urge it outwards and disengage its inner end from the serration 20 freeing the arms 10 to be urged together to expand the loop of wire 13' to be disengaged from the jar.

In the modification of the invention disclosed in Fig. 7, the construction of the jar grip is characterized by crossing arms 10' of plastic material provided at their outer ends with scissors type handles 30 and at their bottom ends with plastic grip jaws 13''. This form of the invention is also provided with a manually depressible rod 21 for locking the arms 10' in their various selected pivoted positions.

In other respects this form of the invention is similar to portions of each of the previous modifications and like reference numerals are used to identify like parts in each of the several views.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A jar grip, comprising a pair of crossed and pivotally connected arms, and a jar gripping member mounted on the front ends of said arms, said pivotally connected arms being formed of wood, said jar gripping member comprising a loop of wire having its ends passed slideably through a ring and then connected to the front ends of said arms.

2. A jar grip, comprising a pair of crossed and pivotally connected arms, a jar gripping member mounted on the front ends of said arms, means for locking said arms in selected pivoted positions, said pivotal connection comprising a pin passing through the crossed areas of said arms and having one of said arms pinned fixedly thereto, said locking means comprising a peripherally serrated collar fixedly mounted on said pin withing a cavity formed in the other of said arms, and a rod slidably mounted in said arm having said cavity and having an end projected from said arm to be manually urged inwards to engage the serrations of said collar and hold said arms against relative pivoting.

3. A jar grip, comprising a pair of crossed and pivotally connected arms, a jar gripping member mounted on the front ends of said arms, means for locking said arms in selected pivoted positions, said pivotal connection comprising a pin passing through the crossed areas of said arms and having one of said arms pinned fixedly thereto, said locking means comprising a peripherally serrated collar fixedly mounted on said pin within a cavity formed in the other of said arms, a rod slidably mounted in said arm having said cavity and having an end projected from said arm to be manually urged inwards to engage the serrations of said collar and hold said arms against relative pivoting, and means urging said rod into an extended position disengaged from said serrations freeing arms to be pivoted relative to one another.

4. A jar grip, comprising a pair of crossed and pivotally connected arms, a jar gripping member mounted on the front ends of said arms, means for locking said arms in selected pivoted positions, said pivotal connection comprising a pin passing through the crossed areas of said arms and having one of said arms pinned fixedly thereto, said locking means comprising a peripherally serrated collar fixedly mounted on said pin within a cavity formed in the other of said arms, a rod slidably mounted in said arm having said cavity and having an end projected from said arm to be manually urged inwards to engage the serrations of said collar and hold said arms against relative pivoting, means urging said rod into an extended position disengaged from said serrations freeing arms to be pivoted relative to one another comprising an enlarged collar mounted on an intermediate area of said rod within an enlarged recess formed in said arm housing said rod, and an expansion spring operating between said collar and an end wall of said cavity urging said rod into an extended position.

PHILIP J. SENK.